Dec. 29, 1964  R. C. CARLSON  3,163,791
MOTOR SYSTEM
Filed April 4, 1960  3 Sheets-Sheet 2
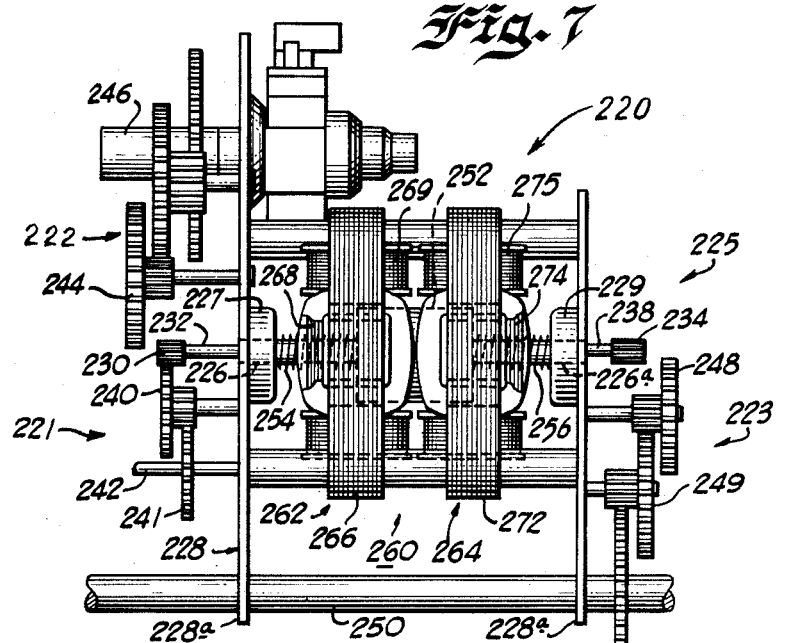
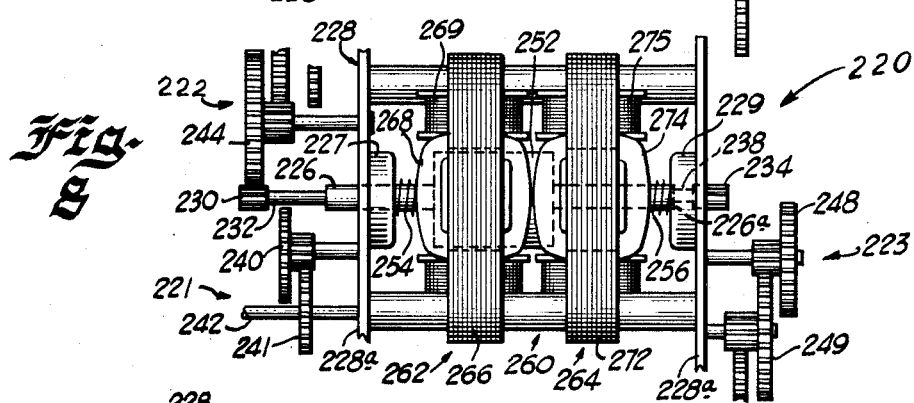
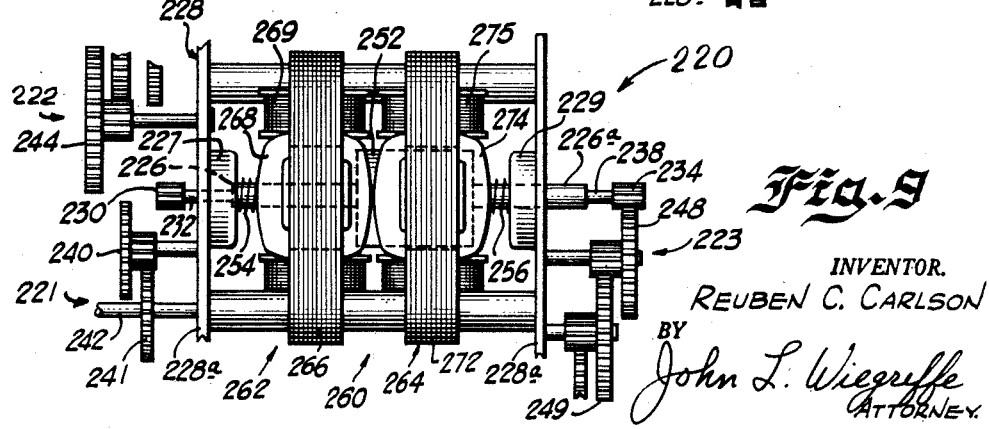
INVENTOR.
REUBEN C. CARLSON
BY
John L. Wiegriffe
ATTORNEY.

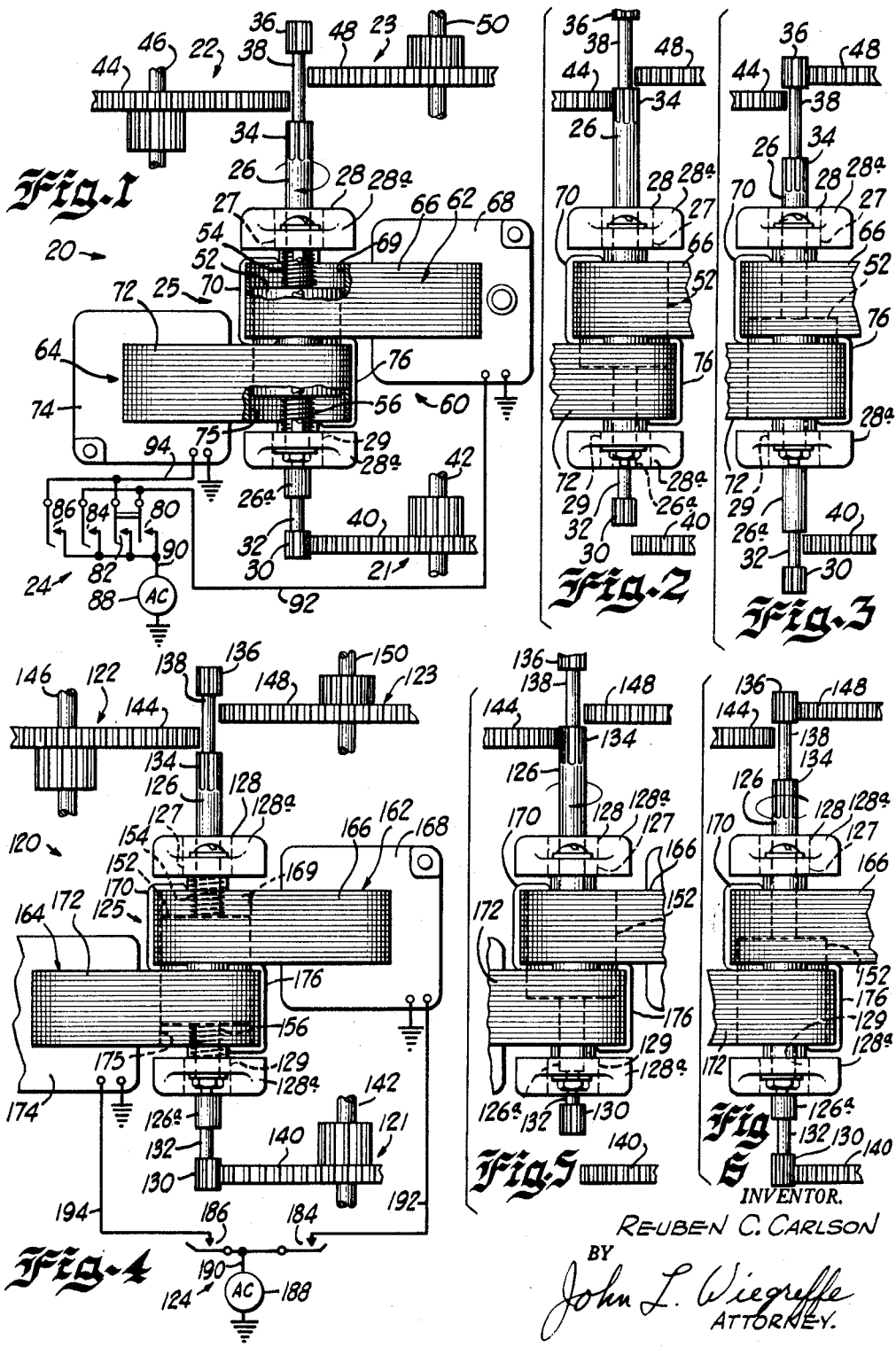

Dec. 29, 1964　　　R. C. CARLSON　　　3,163,791
MOTOR SYSTEM
Filed April 4, 1960　　　　　　　　　　3 Sheets-Sheet 3
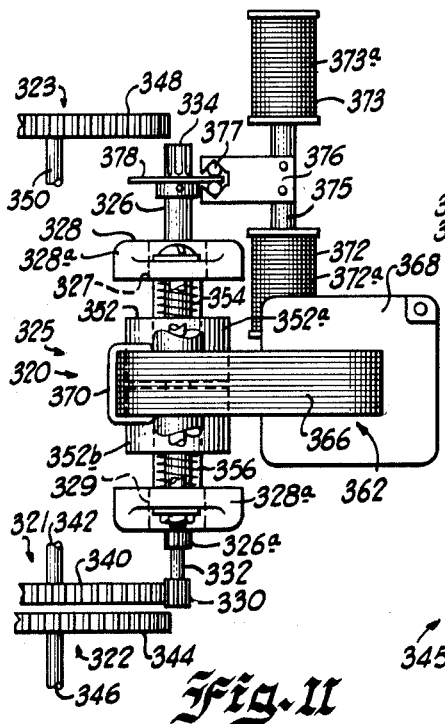
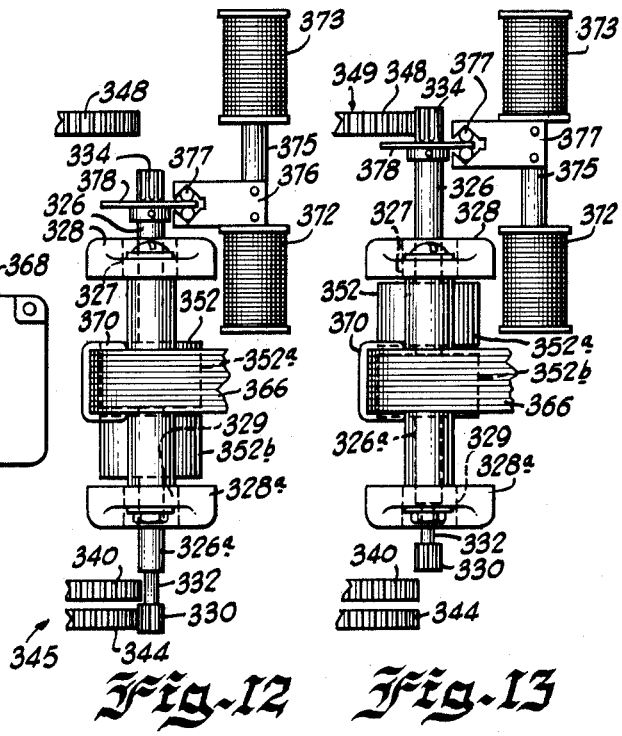
Fig. 11　　Fig. 12　　Fig. 13
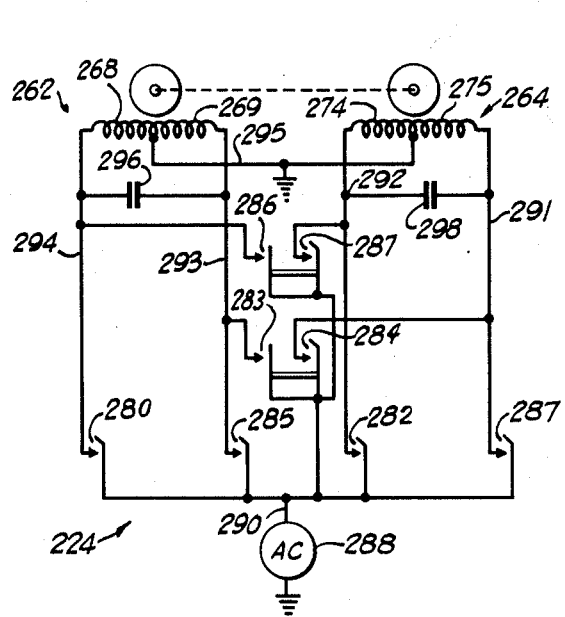
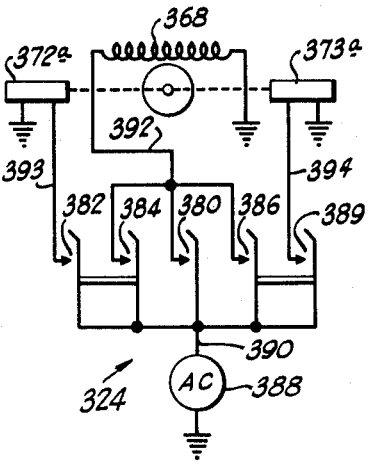
Fig. 14
Fig. 10
INVENTOR.
REUBEN C. CARLSON
BY John L. Wiegreffe
ATTORNEY.

United States Patent Office 3,163,791
Patented Dec. 29, 1964

3,163,791
MOTOR SYSTEM
Reuben C. Carlson, Bensenville, Ill., assignor to Admiral Corporation, Chicago, Ill., a corporation of Delaware
Filed Apr. 4, 1960, Ser. No. 19,716
4 Claims. (Cl. 310—83)

The present invention relates to a motor system and, more particularly, relates to a motor system having an output driving means for producing bidirectional or unidirectional movement in one of a plurality of axial positions.

It is an object of the present invention to provide a new and improved motor system characterized by having an output driving means that is capable of delivering unidirectional or bidirectional movement in a plurality of axially displaced positions.

It is another object of the present invention to provide a new and improved motor system wherein a single motor arrangement is adapted to selectively drive one of a plurality of output means in a predetermined direction.

It is still another object of the present invention to provide a new and improved motor system having output driving means which is adapted to simultaneously assume one of a plurality of axially displaced positions and rotate in one of a plurality of selected directions.

It is a further object of the present invention to provide a motor system embodying a plurality of spaced-apart output driven means, each of which is adapted to be driven in a selected direction by a movable output driving means that is capable of producing unidirectional or bidirectional movement.

It is yet a further object of the present invention to provide in a new and improved motor system a composite stator structure that produces in an output driving means both selected axial and selected rotary movement.

It is another object of the present invention to provide in a new and improved system a composite rotor structure that effects in an output driving means both selected axial and selected rotary movement.

The above and other objects are achieved in accordance with the present invention by providing a new and improved motor system having an output driving means adapted to produce bidirectional or unidirectional movement in one of a plurality of output driven means. Specifically, incident to energization of the motor system, the output driving means assumes one of a plurality of axially displaced positions to drive one of the output driven means in a selected direction depending upon the form of the motor system.

In one embodiment of the present invention, the motor system embodies a composite stator arrangement for effecting the necessary axial and rotary movement of the drive shaft means. In a first form of this same embodiment, the composite stator arrangement causes the output driving means to rotate in only one direction when in any one of its axial positions, thereby effecting unidirectional movement of any one of the output driven means. In a second form of this same embodiment, the composite stator arrangement causes the output driving means to rotate in either direction when in any of its axial positions, thereby effecting bidirectional movement of any one of the output driven means.

In a second embodiment of the present invention, the motor system embodies a composite rotor arrangement in the output driving means which is axially moved independently of the stator arrangement into any one of its axial positions to drive a corresponding output driven means. The direction of rotation of the output driving means, and hence the driven means, is controlled by the stator arrangement of the motor system similar to the first embodiment.

The invention, both as to its organization and method of operation, taken with further objects and advantages thereof, will best be understood by reference to the following description taken in connection with the accompanying drawings, in which:

FIG. 1 is a fragmentary plan view of a first embodiment of a motor system embodying the features of the present invention, illustrating its output driving means in operative driving engagement with a first output driven means;

FIG. 2 is a fragmentary plan view of the motor system of FIG. 1, illustrating the output driving means in operative driving engagement with a second output driven means;

FIG. 3 is a fragmentary plan view of the motor system of FIG. 1, illustrating the output driving means in operative driving engagement with a third output driven means;

FIG. 4 is a fragmentary plan view of another embodiment of the present invention comprising a modified form of the motor system of FIG. 1, illustrating the output driving means in operative driving engagement with a first output driven means;

FIG. 5 is a fragmentary plan view of the motor system of FIG. 4, illustrating the output driving means in operative driving engagement with a second output driven means;

FIG. 6 is a fragmentary plan view of the motor system of FIG. 4, illustrating the output driving means in operative driving engagement with a third output driven means;

FIG. 7 is a fragmentary plan view of yet another embodiment of the present invention comprising yet another modified form of the motor system of FIG. 1, illustrating the output driving means in operative driving engagement with a first output driven means;

FIG. 8 is a fragmentary plan view of the motor system of FIG. 7, illustrating the output driving means in operative driving engagement with a second output driven means;

FIG. 9 is a fragmentary plan view of the motor system of FIG. 7, illustrating the output driving means in operative driving engagement with a third output driven means;

FIG. 10 is a schematic view of a control circuit used with the motor system shown in FIG. 7;

FIG. 11 is a fragmentary plan view of a further embodiment of a motor system embodying the features of the present invention, illustrating an output driving means in operative driving engagement with a first output driven means;

FIG. 12 is a fragmentary plan view of the motor system in FIG. 11, illustrating the output driving means in operative driving engagement with a second output driven means;

FIG. 13 is a fragmentary plan view of the motor system of FIG. 11, illustrating the output driving means in operative driving engagement with a third output driven means; and FIG. 14 is a schematic view of an electrical circuit used with the motor system shown in FIG. 11.

Referring now generally to the drawings, various motor systems embodying the principles of the present invention are illustrated. In FIGS. 1, 2 and 3 the motor system is identified generally by reference numeral 20 and is operative to effect the same unidirectional movement in any one of the three spaced apart, output driven means or gear mechanisms 21, 22, and 23. The motor system illustrated in FIGS. 4, 5, and 6 is identified generally by reference numeral 120 and is operative to effect opposite unidirectional movement in either of the spaced apart, output driven means or gearing mechanisms 122 and 123. In FIGS. 7, 8, 9, and 10, the motor system is generally identified by reference numeral 220 and is operative to produce bidirectional movement in any one of three spaced apart, output driven means or gear mechanisms 221, 222, and 223. The motor system illustrated in FIGS. 11, 12, and 13 is generally identified by reference numeral 320 and is operative to produce unidirectional movement in any one of three spaced apart, output driven means or gear mechanisms 321, 322, and 323. It should be appreciated, however, that the motor system 320, in a modified form, not illustrated, can effect bidirectional movement of the gear mechanisms 321, 322, and 323.

A particular application of the motor system of the present invention is in television receivers where the main tuning shaft, volume potentiometer shaft, and fine tuning potentiometer shaft are controlled by being connected to the three above-mentioned gear mechanisms, respectively. Of course, the motor system has many other uses and applications and, for example, is equally well-suited to be used in automatic record playing machines, i.e., jukeboxes, for adjusting selected control elements which regulate the machine's various functions.

Referring now to the FIG. 1 embodiment, the motor system 20 embodies an electrical circuit means 24 for suitably controlling a motor apparatus 25. The motor apparatus 25 is of the A.C. squirrel-cage type and when energized by the electrical circuit 24 effects the clockwise rotation (as viewed from the top of FIG. 1) of an output driving means, identified generally as 26. Because of the type of stator arrangement, described below, the motor output driving means or drive shaft 26 rotates only in a clockwise direction, but, of course, the drive shaft 26 could rotate in the opposite or counterclockwise direction, if the location of the shading coils were altered. In any event, the drive shaft 26 is rotatably supported from and is axially movable relative to a casing 28 by a pair of bearing assemblies (27 and 29) suitably secured to the spaced apart arms 28a of the casing 28. The lower end of the drive shaft 26 comprises a pinion 30 which is connected to the body 26a of the drive shaft 26 by a neck portion 32. In contrast to the lower end of the drive shaft 26, the upper end comprises a pair of pinions 34 and 36 which are spaced apart and interconnected by a neck portion 38. The drive shaft pinions 30, 34 and 36 are adapted to drive the gearing mechanisms 21, 22, and 23, respectively, in response to selective axial movement of the drive shaft 26 under the control of the control circuit 24.

More specifically, when the drive shaft 26 is in its neutral position shown in FIG. 1, the pinion 30 drivingly engages the mtchanism 21, i.e., engages a spur gear 40 drivingly connected to a shaft 42, while the pinions 34 and 36 do not drivingly engage the mechanisms 22 and 23, respectively. When the drive shaft 26 is in its upwardly displaced position, the pinion 34 drivingly engages the mechanism 22, i.e., engages a spur gear drivingly connected to a shaft 46, while the pinions 30 and 36 are out of driving engagement with mechanisms 21 and 23, respectively. On the other hand, when the drive shaft 26 is its downwardly displaced position, the pinion 36 drivingly engages the mechanism 23, i.e., engages a spur gear 48 drivingly connected to a shaft 50, while the pinions 30 and 34 are out of driving engagement with mechanisms 21 and 22, respectively. Hence, it will be appreciated that the shafts 42, 46, and 50 can be selectively rotated in a counterclockwise direction for a predetermined period of time depending upon the operative time of the motor apparatus 25—which operative time is directly controlled by the control circuit 24. Accordingly, depending upon the character of the control circuit 24, the shafts 42, 46, and 50 can be continuously or incrementally adjusted.

Returning now to the description of the structural details of the motor apparatus 25, it further comprises a rotor 52 suitably secured to the output shaft 26 and biased equidistantly from the casing arms 28a by a pair of coil springs 54 and 56, the springs being coiled about the drive shaft 26 and having their ends respectively seated against the casing arms 28a and the sides of the rotor 52. The rotor 52, of course, is generally cylindrical and includes a plurality of axially extending bars (not shown) embedded along the cylindrical wall of the rotor 52 to form the well-known squirrel-cage rotor construction.

In accordance with an aspect of the present invention, the motor apparatus 25 includes a composite stator arrangement 60 which is energized by the control circuit 24 to effect both axial and rotary movement of the rotor 52 and, hence, the driveshaft 26. The arrangement 60 comprises a first stator 62 and a second stator 64 each of which is adapted to coact with and axially displace the rotor 52 in a predetermined way. More particularly, the first stator 62 comprises a U-shaped, laminated core 66 having a control winding 68 wound about its bight portion. Although not clearly illustrated in FIG. 1, the bight portion of the stator 62 is located to the right of the rotor 52, as viewed in FIG. 1; in fact, substantially all of the stator 62 extends to the right of the rotor 52. In any event, two opposing pole pieces (only one of the pole pieces is identified as 69) extend toward one another at the ends of the arms of the core 66 to provide, in conjunction with the rotor 52, a generally closed magnetic circuit for the field generated by the control winding 68. The pole pieces 69 have generally semi-cylindrical opposing faces to define a generally cylindrical opening which is slightly oversized to accommodate the rotor 52. Two electrically conductive, short-circuited, shading windings or coils 70 (only one of which is illustrated) are supported by the pole pieces 69 adjacent to the rotor 52 to provide a self-starting means for the apparatus 25 incident to energization of the control winding 68. The shading coils 70 are so located on the pole pieces 69 of the core 66 that the rotor 52 and the driveshaft 26 rotate in a clockwise direction.

The second stator 64 is constructed substantially similar to that of the stator 62. It comprises a generally U-shaped, laminated core 72 having a control winding 74 wound about its bight portion. Although not clearly shown in FIG. 1, the bight portion of the stator 64, in contrast to the bight portion of the stator 62, is located to the left of the rotor 52, as viewed in FIG. 1; accordingly, substantially all of the stator 64 extends to the left of the rotor 52 and, more specifically, extends in the opposite direction from the stator 62. Two opposing pole pieces (only one of the pieces is identified as 75) extend toward one another at the ends of the arms of the laminated core 72 to provide, in conjunction with the rotor 52, a generally closed magnetic circuit for the field generated by the control winding 74. The pole pieces 75 have semi-cylindrical opposing faces to define a generally cylindrical opening which is slightly oversized to accommodate the rotor 52. Two electrically conductive, short-circuited shading windings or coils 76 (only one of which is shown) are supported by the pole pieces 75 adjacent to the rotor 52 to provide a self-starting means for the apparatus 25. However, even though the stators 62 and 64 are oppositely related to the rotor 52, the rotor 52 and the driveshaft 26 nonetheless rotate in a clockwise direction incident to energization of the control winding 74. This result obtains since the shading coils 76 are not located in the same relationship to the pole pieces 75 as the shading coils 70 are relative to the pole pieces 69, but are located so that the rotor 52 rotates in an opposite direction relative to the stator 64 yet in the same direction relative to the frame 28 as when driven by the stator 62. Thus the stators 62 and 64 can be considered as being phase additive.

If the stators 62 and 64 are not energized, the rotor 52 is biased by the coiled springs 54 and 56 into a position equidistant the walls of the casing 28. In this neutral position, the rotor 52 extends partially between the pole pieces 69 of the core 66 and partially between the pole pieces 75 of the core 72 and, in a sense, straddles the first and second stators 62 and 64. Specifically, the upper half of the rotor 52 extends approximately half way between the pole pieces 69 of the core 66, while the lower half of the rotor 52 extends substantially half way between the pole pieces 75 of the core 72. It will be appreciated that when the control winding 68 is energized, the rotor 52 moves axially upward, since it is drawn into the magnetic field developed by the control winding 68, and lies entirely between the pole pieces 69 of the core 66, as shown in FIG. 2. Alternatively, when the control winding 74 is energized, the rotor 52 moves axially downward, since it is drawn into the magnetic field developed by the control winding 74, and lies entirely between the pole pieces 75 of the core 72 to assume the position shown in FIG. 3. This result occurs because of the basic electromagnetic principle that a magnetic member seeks a position in a magnetic field that produces a minimum air gap for the field's flux lines. It is well known that the reluctance of the magnetic circuit decreases with a shorter air gap, with the result that the flux strength of the field increases.

In order to effect a unidirectional movement of a selective one of the shafts 42, 46, or 50 of the gearing mechanisms 21, 22, and 23, the control circuit 24 is suitably operated. In order to simplify the illustration of the control circuit, only the contacts located in the energizing circuits of the control windings 68 and 74 are illustrated, it being appreciated that the contacts can be opened and closed by suitable relays, switches, or camming elements and the like. Assuming that it is desired to drive in a counterclockwise direction the shaft 42 of the mechanism 21, a suitable relay (not shown) is energized to effect the closure of a pair of contacts 80 and 82, thereby completing energizing circuits for both the control windings 68 and 74 of the stators 62 and 64, as follows: for the control winding 68—ground, A.C. source 88, conductor 90, contacts 80, conductor 92, control winding 68, and ground; for the control winding 74—ground, A.C. source 88, conductor 90, contacts 82, conductor 94, control winding 74, and ground. Incident to the simultaneous energization of the control windings 68 and 74, separate magnetic fields are produced by the windings 68 and 74 to cause the rotor 52 to rotate in a clockwise direction. However, since the magnetic fields developed across the pole pieces 69 and 75 of the stators 62 and 64 are equal in magnitude, no axial movement of the rotor 52 of the drive shaft 26 is obtained. Hence, since the pinion 30 is in driving engagement with the spur gear 40 of the mechanism 21 when the rotor and drive shaft 26 are in their neutral positions, the shaft 42 is rotated in a counterclockwise direction. The rotation of the shaft 42 is continued until the control windings 68 annd 74 are deenergized in response to opening of the contacts 80 and 82 under the control of the relay (not shown).

If it is desired to drive the shaft 46 in a counterclockwise direction and assuming that the system 20 is not being operated, a suitable relay (not shown) is operated to close a pair of contacts 84, thereby completing an energizing circuit for the control winding 68 of the stator 62, as follows: ground, A.C. source 88, conductor 90, contacts 84, conductor 92, control winding 68, and ground. Incident to energization of the control winding 68, the rotor 52 simultaneously rotates in a clockwise direction and is axially displaced upwardly by the magnetic field in the core 66 between the pole pieces 69. Specifically, the rotor 52 moves from its neutral position illustrated in FIG. 1 to its operative upwardly displaced position illustrated in FIG. 2. As shown, the pinion 34 drivingly engages the spur gear 44 of the mechanism 22 to effect a driving connection between the drive shaft 26 and the output shaft 46, with the result that the shaft 46 rotates in a counterclockwise direction. The shaft 46 continues to rotate as long as the winding 68 is energized under the control of the relay contacts 84.

If it is desired to drive the shaft 50 in a counterclockwise direction and assuming that the system 20 is not in operation, a suitable relay (not shown) is energized to close the contacts 86, thereby completing an energizing circuit for the control winding 74 of the stator, as follows: ground, A.C. source 88, conductor 90, contacts 86, conductor 94, control winding 74, and ground. Incident to energization of the control winding 74, the rotor 72 is simultaneously rotated in a clickwise direction and axially displaced downwardly by the magnetic field in the core 72 between the pole pieces 75. Specifically, the rotor 52 is moved from its neutral position illustrated in FIG. 1 into its operative downwardly displaced position, illustrated in FIG. 3. As shown in FIG. 3, the pinion 36 drivingly engages the spur gear 48 of the mechanism 23 to effect a driving connection between the shafts 26 and 50, with the result that the shaft 50 rotates in a counterclockwise direction. The rotation of the output shaft 50 is continued as long as the control winding 74 is energized and the relay (not shown) is operated to maintain the contacts 86 closed. From the foregoing description, it will be appreciated that a selected one of the shafts 42, 46, or 50 can be rotated in a counterclockwise direction for predetermined periods of time by controlled energization of a selective one of the relays associated with the contacts 80–82, 84, and 86.

In contrast to the operation of the above-described motor system, it may be desirable to drive one shaft of a gearing mechanism in a clockwise direction and a second shaft of another gearing mechanism in a counterclockwise direction. In this connection, the motor system illustrated in FIGS. 1, 2, and 3 can be modified slightly to produce the motor system 120 illustrated in FIGS. 4, 5, and 6. Specifically, motor system 120 differs from the system 20 in that instead of the composite stator arrangement being "phase additive," the composite stator arrangement is in "phase opposition." Particularly, the first stator 162 causes the drive shaft 126 to be simultaneously rotated in a clockwise direction and to be axially displaced upwardly, while the second stator 164 causes the drive shaft 126 to rotate in a counterclockwise (instead of clockwise) direction and to be axially displaced downwardly.

Considering in greater detail the embodiment of the motor system illustrated in FIGS. 4, 5, and 6, it comprises a unidirectional motor apparatus 125, generally similar to motor apparatus 25, operated under the control of a control system 124 to selectively drive shafts 146 and 150 of the gearing mechanisms 121 and 122 in opposite directions from one another. The physical construction of the motor apparatus 125 is identical to the construction of the motor apparatus 25, with the exception that the shading coils 170 and 176 are identically located relative to their associated pole pieces 169 and 175. Thus, with the laminated cores 166 and 172 oppositely related to the drive shaft 126, the shaft 126 turns in the same direction relative to the cores 166 and 172, but turns in opposite directions relative to the frame 128. By this arrangement, the cores 166 and 172 may be considered to be in phase opposition since, if both cores 166 and 172 are simultaneously energized, the drive shaft 126 is "locked" in its neutral position. Consequently, the gearing mechanism 121 is at no time driven by the shaft 126, while the shaft 146 of the gearing mechanism 122 is selectively driven in a counterclockwise direction and the shaft 150 of the gearing mechanism 123 is driven in a clockwise direction.

The drive shaft 126 is supported from the casing arms 128a by a pair of bearing assemblies 127 and 129 so that, similar to the drive shaft 26, the shaft 126 rotates and moves axially of the casing 128. The drive shaft 126, similar to the drive shaft 26, includes at its lower end a pinion 130 which engages, but does not at any time drive, the gearing mechanism 121, and at its upper end a pair of pinions 134 and 136 which are spaced apart and interconnected by a neck portion 138. A rotor 152, identical to the rotor 52, is suitably secured to the drive shaft 26 and is urged equidistantly of the casing walls 128a by a pair of coil springs 154 and 156. The rotor 152, when in its neutral position, extends upwardly approximately half way between the pole pieces 169 in a laminated core 166 of the first stator 162, a control winding 168 being wound about the bight portion of the core 166. The lower half of the rotor 152 extends substantially half way between the pole pieces 175 of a laminated core 172 of the stator 164 which includes a control winding 174 located about the bight portion of the laminated core 172.

Inasmuch as the first and second stators 162 and 164 are in phase opposition, no provision is made in the control circuit 124 for simultaneously energizing the control windings 168 and 172. For this reason, the control circuit 124 is somewhat simplified and includes only contacts 184 and 186, respectively, operated by suitable relays (not shown). Hence, in contrast to the FIG. 1 embodiment, the motor system 120 selectively drives the shaft 146 of the gearing mechanism 122 in a counterclockwise direction only and the shaft 150 of the gearing mechanism 123 in a clockwise direction only.

In order to drive the shaft 146 in a counterclockwise direction, contacts 184 are closed by operating its associated relay (not shown) to complete the energizing circuit for the control winding 168, as follows: ground, A.C. source 188, conductor 190, contacts 184, conductor 192, control winding 168, and ground. Thus, the shaft 126 rotates in a clockwise rotation and moves axially upward into the field of the stator 162, with the result that the pinion 134 engages gear 144 of the mechanism 122 to effect a driving connection between the shafts 126 and 146, whereby the shaft 146 rotates in a counterclockwise direction.

On the other hand, in order to drive the shaft 150 in a clockwise direction, contacts 186 are closed by operating its associated relay (not shown) to complete the energizing circuit for the control winding 174, as follows: ground, A.C. source 188, conductor 190, contacts 186, conductor 194, control winding 174, and ground. Hence, the shaft 126 rotates in a counterclockwise direction and moves axially downward into the field of the stator arrangement 164, thereby causing the pinion 136 to engage the gear 148 of the mechanism 123 and drive the shaft 150 in a clockwise direction.

It will be appreciated from the foregoing description that since the motor apparatus 25 embodied in the FIG. 1 embodiment is of the unidirectional type, the output shaft 26 rotates in only one direction. However, if a bidirectional motor is substituted for the unidirectional motor 25, bidirectional movement of the output shaft 26 in axially displaced positions could be produced. Such a substitution is contemplated in the FIG. 7 embodiment of the motor system and, to this end, stator arrangements capable of producing bidirectional movement are employed instead of the above described stator arrangements that develop unidirectional movement.

Considering now the embodiment illustrated in FIGS. 7, 8, 9, and 10, the motor system 220 embodies a motor apparatus 225 which is operative to cause its drive shaft 226 to selectively engage and effect either clockwise or counterclockwise movement of any one of the gear mechanisms 221, 222, and 223. Specifically, the motor apparatus 225 comprises an A.C. squirrel-cage type motor which is energized by circuit means 224, illustrated in FIG. 10, to effect either clockwise or counterclockwise rotation (as seen from the right side of the apparatus in FIG. 7), of the output driving means or drive shaft, identified generally as 226. The drive shaft 226 is journaled in a pair of bearing assemblies 227 and 229 suitably supported from casing walls 228a so that it is rotatably and axially movable relative to the casing 228. As shown, the drive shaft 226 extends through the casing walls 228a and includes at its left end a pinion 230 and at its right end a pinion 234, the pinions 230 and 234 being connected to the body 226a of the drive shaft 226 by neck portions 232 and 238, respectively, as described in greater detail hereinafter, the pinion 230 is adapted to move into driving engagement with the gearing mechanism 221 in one operative position and into driving engagement with the gearing mechanism 222 in another operative position, while the pinion 234 is adapted to move into driving engagement with the gearing mechanism 223, in another operative position of the drive shaft 226.

Similar to the FIG. 1 and FIG. 4 embodiments, a rotor 252, illustrated in dotted lines in FIG. 7, is suitably secured to the drive shaft 226 and is biased into a neutral position equidistant the casing walls 228a by a pair of coil springs 254 and 256 wound about the body portion 226a of the drive shaft 226, the ends of the coil springs 254 and 256 abutting the inner surfaces of the bearing assemblies 227 and 229 and the outwardly facing surfaces of the rotor 252.

The movement of the rotor 252 is controlled by a composite stator arrangement 260, in the same general manner as the stator arrangement 60. However, in contrast to the stator arrangement 60 which produces unidirectional movement only, the stator arrangement 260 effects bidirectional movement under the control of the control circuit 224. In this connection, the rotor 252 when in its neutral position coacts with both a first stator 262 and a second stator 264. Similar to the stators 62 and 64 in the FIG. 1 embodiment, the stators 262 and 264 are located in side by side relationship, but in contrast to the stators 62 and 64, they include laminated cores 266 and 272 which are symmetrically related to the rotor 252.

Further, instead of being of general U-shaped configuration, the laminated cores 266 and 272 are of generally square shaped configuration, each having four inwardly extending legs located equidistant its corners. The legs (not shown) in each stator 262 and 264 terminate in four pole pieces which have generally cylindrical or curved surfaces to define a generally cylindrical oversized opening for accommodating the rotor 252. The stator 264 effects bidirectional movement of the rotor 252 by employing two pairs of control windings 268 and 269, the control windings 268 being wound on a first pair of oppositely related legs of the core 266, and the control windings 269 being wound on a second pair of oppositely related legs of the core 266. Similarly, the stator 264 effects bidirectional movement of the rotor 252 by employing control windings 274 and 275, the control windings 274 being wound about a first pair of oppositely related legs of the core 272 and the control windings 275 being wound about a second pair of oppositely related legs of the core 272. In contrast to the stators 62 and 64, the core constructions 266 and 272 do not embody short-circuited shading coils to control the direction of rotation of the rotor, but rely upon the interaction of the control windings 268–269 or 274–275 to control the direction of rotation of the rotor 252.

The rotor 252 is biased in its neutral position intermediate casing plates 228a, as shown in FIG. 7, by coil springs 254 and 256. Similiar to the FIGS. 1 and 4 embodiments, the left end of the rotor 252 extends half way between the pole pieces of the core construction 266 while its right end extends approximately half way between the pole pieces of the core construction 272. It will be appreciated that when either of the control windings 268 or 269 of the core 266 is energized, the drive shaft 226 rotates in either a clockwise or counterclockwise direction and, in addition, is simultaneously drawn into the magnetic field of the core 262 to be displaced into an operative leftward position, shown in FIG. 8, in the same manner as described in connection with the FIG. 1 embodiment. On the other hand, if either of the control windings 274 or 275 is energized, the rotor 252 rotates in either a clockwise or counterclockwise direction and, in addition, is drawn into the magnetic field of core 272 to be displaced into an operative rightward position, shown in FIG. 9. Of course, if both the control windings 268 of the core 266 and the control windings 274 of the core 272 are energized, the rotor 252 rotates in a clockwise direction but is not axially displaced because of the cancelling effect of the fields of the cores 266 and 272. Conversely, if both the control windings 269 of the core 266 and the control windings 275 of core 272, are energized, the rotor 252 rotates in a counterclockwise direction and is not axially displaced.

Similar to the FIG. 1 embodiment, when the rotor 252 is in its neutral operative position shown in FIG. 7, the pinion 230 drivingly engages a gear 240 of a gearing mechanism 221; when the rotor is in its operative position shown in FIG. 8, the pinion 230 drivingly engages a gear 244 of a gearing mechanism 222; and when the rotor 252 is in its operative position shown in FIG. 9, the pinion 234 drivingly engages a gear 248 of a gearing mechanism 223. The mechanisms 221, 222, and 223 include idler gears (not identified) and driven shafts 242, 246, and 250, respectively.

As in the case of the FIG. 1 or FIG. 4 embodiments, movement of the rotor 252 and hence the drive shaft 226 is controlled by the control circuit 224, illustrated in FIG. 10. In order to drive shafts 242, 246, or 250 of gearing mechanisms 221, 222, or 223 in either a clockwise or a counterclockwise direction, contacts are suitably located in the energizing circuits for the control windings 268, 269, 274, and 275, the contacts being opened and closed under the control of suitable relays, switches, camming elements, or the like.

If it is desired to drive the shaft 242 in a first direction, assuming that the motor apparatus 225 is in an inoperative condition, a suitable relay (not shown) is operated to close ganged contacts 286 and 287, thereby completing the energizing circuits for the control windings 268 and 274, as follows: for the control winding 268—ground, A.C. source 288, conductor 290, contacts 286, control winding 268, conductor 295, and ground; for the control winding 274—ground, A.C. source 288, conductor 290, contacts 287, control winding 274, conductor 295, and ground. Consequently, magnetic fields are developed by both of the stators 262 and 264 to effect the rotation of the rotor 252. It will be appreciated that because of the bidirectional character of the stators 262 and 264, shading coils are not used in the motor apparatus. However, since the other windings 269 and 275 are respectively connected across the energized control windings 268 and 274 through condensers 296 and 298, respectively, there is produced auxiliary magnetic fields having 90° phase displacements relative to the magnetic fields developed by the windings 268 and 274. These auxiliary fields perform a function similar to the shading coils in the FIG. 1 embodiment and cause the rotor 242 to rotate in a clockwise direction, as viewed from the right of FIG. 7.

In any event, with both of the control windings 268 and 274 energized, the rotor 252 is neither displaced to the left nor to the right, but is maintained in its neutral position, shown in FIG. 7, by the coil springs 254 and 256 since the axial components of the magnetic field tend to cancel one another, similar to the FIG. 1 embodiment. Accordingly, the drive shaft 226 and its pinions 230, 234 remain in their neutral position and, since the pinion 230 is in driving engagement with the spur gear 240 of the gear mechanism 221, a driving connection is obtained between the drive shaft 226 and the shaft 242 of the mechanism 221. Thus, since the drive shaft 226 rotates in a clockwise direction, the shaft 242 also rotates in a clockwise direction and the shaft 242 continues to rotate as long as the contacts 286 and 287 remain closed under the control of their associated relay.

On the other hand, if it is desired to rotate the shaft 242 in a counterclockwise direction assuming that the apparatus 252 is in an inoperative condition, a suitable relay (not shown) is energized to close ganged contacts 283 and 284, thereby completing energizing circuits for the control windings 269 and 275, as follows: for the control winding 269—ground, A.C. source 288, conductor 290, contacts 283, conductor 293, control winding 269, conductor 295, and ground; for the control winding 275—ground, A.C. source 288, conductor 290, the contacts 284, conductor 291, control winding 275, conductor 295, and ground. Again, magnetic fields are developed by both of the stators 262 and 264 to effect the rotation of the rotor 252. The control windings 269 and 275 develop the main magnetic fields while the control windings 268 and 274, being connected across the windings 269 and 275 through the condensers 296 and 298, produce auxiliary fields having 90° phase displacements relative to the fields of the windings 269 and 275. The auxiliary fields serve the same purpose as the above-described shading coils and since the function of the windings 268, 269, 274, and 275 are reversed, the rotor 252 rotates in a direction opposite that described above, i.e., in a counterclockwise direction. Since the axial components of the magnetic fields in both the cores 266 and 272 nullify one another, the rotor 252 is displaced neither to the left nor the right, but is maintained in its neutral position under the control of the coil springs 254 and 256. Hence, since the pinion 230 is in driving engagement with the gear 242 when the rotor 252 is in its neutral position, a driving connection is obtained between the drive shaft 226 and the shaft 242 of the gearing mechanism 221 with the result that the shaft 242 rotates in a counterclockwise direction. The shaft 242 continues to rotate in a counterclockwise direction as long as the control contacts 282 and 284 are closed under the control of their associated relay.

If, however, it is desired to drive the shaft 246 in a counterclockwise direction assuming that the motor apparatus 225 is inoperative, a suitable relay is energized to close a pair of contacts 280, thereby to complete an energizing circuit for the control winding 268, as follows: ground, AC source 288, conductor 290, contacts 280, conductor 294, control winding 268, conductor 295, ground. Accordingly, the control winding 268 produces the primary magnetic field while the control winding 269 produces the auxiliary magnetic field, with the result that the rotor 252 rotates in a clockwise direction. Simultaneously, the rotor 252 is drawn into the field existing in the core 266, whereby the rotor 252 moves to the left from its neutral inoperative position shown in FIG. 7 into its operative position shown in FIG. 8. As shown, the pinion 330 drivingly engages the spur gear 244 of the gearing mechanism 222 to effect a driving connection between the drive shaft 226 and the shaft 246. Hence, the drive shaft 246 rotates in a counterclockwise direction and continues to rotate as long as the control winding 268 is energized under the control of the contacts 280 and its associated relay.

On the other hand, if it is desired to rotate the shaft 246 in a clockwise direction, a relay (not shown) is operated to close contacts 285, thereby to complete an energizing circuit for the control winding 269, as follows: ground, AC, source 288, conductor 290, contacts 285, conductor 293, control winding 269, conductor 295, and ground. Consequently, the control winding 269 produces the primary magnetic field while the control winding 268 produces the auxiliary field, with the result that the rotor 252 rotates in a counterclockwise direction. Simultaneously, the rotor 252 is also drawn into the field in the core 266 and is moved from its position illustrated in FIG. 7 into its operative position illustrated in FIG. 8. As shown, the pinion 230 drivingly engages the spur gear 244 of the gear mechanism 222 to effect a driving connection between the drive shaft 226 and the shaft 246, whereby the shaft 246 rotates in a clockwise direction opposite to that described above.

If it is desired to rotate the drive shaft 250 in a counterclockwise direction, a suitable relay (not shown) is operated to close contacts 282, thereby completing an energizing circuit for the control winding 274, as follows: ground, A.C. source 288, conductor 290, contacts 282, conductor 292, control winding 274, conductor 295, and ground. Consequently, the control winding 274 produces the primary magnetic field while the control winding 275 produces the auxiliary field, whereby the rotor 252 rotates in a clockwise direction. Simultaneously, the rotor 252 is drawn into the magnetic field in the core 272 and is moved to the right from its neutral position shown in FIG. 7 into its operative position shown in FIG. 9. In this latter position, the pinion 234 of the drive shaft 226 drivingly engages the spur gear 248 of the mechanism 223 to effect a driving connection between the drive shaft 226 and the shaft 250. Accordingly, the output shaft 250 rotates in a counterclockwise direction as long as the control contacts 282 are closed under the control of its associated relay (not shown).

If, on the other hand, it is desired to rotate the output shaft 250 in a clockwise direction, a suitable relay (not shown) is operated to close the contacts 287, thereby to complete an energizing circuit for the control winding 275, as follows: ground, A.C. source 288, conductor 290, contacts 287, conductor 291, control winding 275, conductor 295, and ground. Accordingly, the control winding 275 produces the primary magnetic field and the control winding 274 produces the auxiliary magnetic field, whereby the rotor 252 rotates in a counterclockwise direction. Simultaneously, the rotor 252 is drawn into the magnetic field in the core 272, with the result that the rotor 252 moves from its neutral position illustrated in FIG. 7 into its operative position illustrated in FIG. 9. As above, when in this latter position, the pinion 234 of the drive shaft 226 drivingly engages the gear 248 of the mechanism 223, thereby to effect a driving connection between the drive shaft 226 and the shaft 250. Hence, the output shaft 250 rotates in a clockwise direction as long as the control contacts 287 are kept closed by its associated relay.

From the foregoing description, it will be appreciated that the FIG. 7 embodiment of the motor system is capable of providing bidirectional movement in a drive shaft in at least three axially displaced positions. Moreover, one of three driven output means can be selectively drivingly connected with the drive shaft which is selectively rotated in one of two directions. As described above, these operational characteristics are realized by employing a composite stator arrangement of the type discussed above.

Considering now the embodiment illustrated in FIGS. 11 through 14, the motor system 320, similar to the FIG. 1 and FIG. 4 embodiments of the motor systems, operates to produce unidirectional movement at a selected one of three output driven means or gear mechanisms 321, 322, or 323. To this end, a unidirectional motor apparatus is illustrated and described; however, it should be appreciated that a bidirectional motor apparatus could also be used and, accordingly, bidirectional movement could be produced at a selected one of the output driven means 321, 322, or 323. The motor system 320 differs principally from the previously described motor systems 20, 120, and 220 in that, first, it embodies a complex rotor structure instead of the simple rotors 52, 152, and 252 and, second, it embodies a simple stator arrangement instead of the composite stator arrangements 60, 160, and 260 described above and, third, it embodies a separately energized displacement means which is operated independently of the motor system to effect the displacement of its drive shaft.

Considering now the structural details of the motor system 320 in greater detail, it comprises a motor apparatus 325 operated under the control of a control circuit 324, illustrated in FIG. 14, to selectively drive one of the shafts 342, 346, and 350 of the gear mechanisms 321, 322, and 323. The motor apparatus comprises a conventional A.C., squirrel-cage type motor having a drive shaft 326 which rotates in only a single direction, for example, a clockwise direction as viewed from the top of FIG. 11. The drive shaft 326 is journaled in a pair of bearing assemblies 327 and 329 suitably supported from casing walls 328a of a casing 328 so that, similar to the drive shafts described above, it is rotatably and axially movable relative to the casing 328. The ends of the drive shaft 326 extend outwardly through the bearing assemblies 327 and 329 and are provided with pinions 330 and 334. The pinion 330 is located at the lower end of the drive shaft 326 and is spaced from and interconnected to the main body of the shaft 326 by a neck portion 332, while the pinion 334 is located at the upper end of the shaft 326 and is connected directly to its main body.

In contrast to the previously described rotors 52 and 252, the motor apparatus 325 embodies a double rotor arrangement including an upper rotor 352a and a lower rotor 352b. The rotors 352a and 352b are constructed substantially identically to one another, as well as to the rotors 52, 152, and 252, with the exception that they are somewhat shorter in length. In any event, the rotors 352a and 352b are fixedly secured to the drive shaft 326 in axially aligned and spaced apart relationship. Similar to the above rotors 52 and 252, the double rotor 352a and 352b is urged into a neutral position equidistant the casing walls 328a by a pair of coiled springs 354 and 356, the ends of the spring 354 abutting against the casing wall 328a and the upper surface of the rotor 352a while the ends of the spring 356 abut against the other casing wall 328a and the lower surface of the rotor 352b.

When the double rotor 352a and 352b is in its neutral position, approximately half of each rotor 352a and 352b extends between pole pieces (not shown) defined in a generally U-shaped laminated core 366 comprising part of a stator arrangement 360. The stator arrangement 360 is substantially identical to the stator arrangement 60 described above and, in this connection, a control winding 368 is wound about its bight portion and a pair of shading coils 370, only one of which is illustrated, is provided adjacent the pole pieces of the core 366.

Inasmuch as the motor apparatus 325 does not embody a composite stator arrangement which can effect the axial displacement of the drive shaft 326 and its associated pinions 330 and 334, the motor system 320 embodies an independent displacing means comprising a pair of solenoids 372 and 373. Specifically, the solenoids 372 and 373 include control windings 372a and 373a which respectively coact with the end of a common armature 375. Attached to the armature 375 is an arm 376 having at its left end (as seen in FIG. 11) a bearing arrangement 377 for coacting with a collar 378 fixedly secured to the drive shaft 326. Hence, in response to energization of either one of the solenoids 372 or 373, the armature 375 is displaced either downwardly or upwardly to effect the downward or upward displacement of the drive shaft 326.

The operation of the solenoids 372 and 373 and, further, the operation of the motor apparatus 325 is controlled by the control circuit 324, illustrated in FIG. 14. The control circuit 324 embodies a plurality of contacts 380, 382, 384, 386, and 389 located in the energizing circuits for the control winding 368 of the motor 325 and solenoid windings 372a and 373a. Selected ones of the contacts are ganged together, as described below, and are controlled by suitable relays (not shown) or, alternatively, mechanical switches or other camming elements.

If it is desired to rotate the shaft 342 of the gearing mechanism 321 in a counterclockwise direction, for example, a suitable relay (not shown) is operated to close the contacts 380, thereby completing an energizing circuit for the control winding 386, as follows: ground, A.C. source 388, conductor 390, contacts 380, conductor 392, control winding 368, and ground. Incident to energizing of the control winding 368, a magnetic field is produced and, because of the location of the shanding coils 370, the double rotor 352 rotates in a clockwise direction. However, since the double rotor 352 is urged into its neutral position illustrated in FIG. 11 by the springs 354 and 356, the magnetic field existing in the core 366 exerts identical axial forces on the rotors 352a and 352b, with the result that the double rotor 352 remains in its neutral position and is not displaced upwardly or downwardly. In its position in FIG. 11, the pinion 330 of the drive shaft 326 drivingly engages a gear 340 of gear mechanism 321, whereby a driving connection between the drive shaft 326 and the shaft 342 is provided. Accordingly, the shaft 342 rotates in a counterclockwise direction, assuming that the mechanism 321 is similar to the mechanism 221 and similar to the previously described shafts, rotates in the counterclockwise direction as long as the control winding 368 is energized under the control of the contacts 380 and its associated relay.

If it is desired to drive output shaft 346 of the gearing mechanism 322 in a counterclockwise direction, for example, a suitable relay (not shown) is energized to close contacts 382 and 384, thereby completing energizing circuits for the control winding 368 of the motor and the winding 372a of the solenoid 372, as follows: for the control winding—ground, A.C. source 388, conductor 390, contacts 384, conductor 392, control winding 368, and ground; and for the solenoid 372—ground, A.C. source 388, conductor 390, contacts 382, conductor 393, solenoid winding 372a, and ground. Incident to energizing of control winding 368, the rotor 352 commences to rotate in a clockwise direction, as described above. Simultaneously therewith, the solenoid 372 operates to displace the armature 375 downwardly, thereby causing the shaft 326 and rotors 352a and 352b to move downwardly from its position ilustrated in FIG. 11 into its downwardly displaced, operative position shown in FIG. 12. In this latter position, the upper rotor 352a is drawn between the pole pieces of the core construction 366 and the rotor 352a is maintained in its downwardly displaced position by the force of the magnetic field in the core 366, irrespective of whether or not the solenoid 372 is deenergized. Accordingly, the pinion 330 drivingly engages a spur gear 344 of the gearing mechanism 322 and provides a driving connection between the drive shaft 326 and the shaft 346. Hence, assuming that the gear mechanism 322 is identical to the mechanism 222, shaft 346 rotates in a counterclockwise direction as long as the control winding 368 is energized under the control of the contacts 384 and its associated relay (not shown).

If it is desired to drive the output shaft 350 of the gearing mechanism 323 in a counterclockwise direction, for example, a suitable relay (not shown) is operated to close contacts 386 and 389, thereby completing an energizing circuit for the control winding 368 and an energizing circuit for the solenoid winding 373a, as follows: for the control winding 368—ground, A.C. source 388, conductor 390, contacts 386, conductor 392, control winding 368, and ground; and for the solenoid winding 373a—ground, A.C. source 388, conductor 390, contacts 389, conductor 394, solenoid winding 373a, and ground. Incident to energizing of the control winding 368, the double rotor 352 commences to rotate in a clockwise direction, as described above. Simultaneously therewith, the solenoid 373 is operated to displace the armature 375 upwardly, with the result that the drive shaft 326 and its associated double rotor 352 are displaced from the position shown in FIG. 11 into its upwardly displaced, operative position shown in FIG. 13. In this latter position, the rotor 352b is drawn between the pole pieces of the core 366 and, since a magnetic field exists in the core 366, the rotor 352 is retained in this upwardly displaced position. When in the position shown in FIG. 13, the pinion 334 drivingly engages a spur gear 348 of the gearing mechanism 323 to effect a driving connection between the drive shaft 326 and the shaft 350. Hence, the output shaft 350 is driven in a counterclockwise direction, assuming the gear mechanism 323 is identical to the mechanism 223, as long as the control winding 368 is energized under the control of contacts 386 and its associated relay (not shown).

As indicated above, the double rotor construction includes a pair of spaced apart rotors 352a and 352b. By spacing the rotors 352a and 352b apart by approximately 1/32 of an inch, the action of the magnetic field is restricted to either one of the rotors 352a or 352b, with the result that the double rotor 352 does not seek a neutral position after it is displaced into its upward or downward operative position shown in FIGS. 12 or 13. On the contrary, the double rotor 352 is maintained in its operative position under the control of the control circuit 324, even though the solenoids 372 or 373 may be independently deenergized after the shaft 326 is displaced.

While several embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A prime mover apparatus comprising an axially movable shaft, drive means on at least one end of said shaft, a plurality of driven means positioned for selective engagement with said drive means, a pair of separately excitable stators, a rotor operatively connected with said shaft, energizing means for said pair of separately excitable stators, said energizing means exciting one of said stators of rotating said rotor and shaft and for axially moving said rotor and shaft into a selected position to obtain a driving connection between said drive means and a first one of said plurality of driven means, exciting the other one of said stators for rotating said rotor and shaft and for axially moving said rotor and shaft in the opposite direction into a selected position to obtain a driving connection between said drive means and a second one of said plurality of driven means and exciting both of said stators simultaneously for rotating said rotor and shaft and for holding said rotor and shaft in a neutral position between said pair of stators to obtain a driving connection between said drive means and a third one of said plurality of driven means, whereby a driving connection between said drive means and a predetermined one of said plurality of driven means is obtained merely by exciting a predetermined one or both of said pair of separately excitable stators.

2. A prime mover apparatus comprising an axially movable shaft, drive means on each end of said shaft, a plurality of driven means positioned for selective engagement with a predetermined one of said drive means, a pair of separately excitable stators, a rotor operatively connected with said shaft, energizing means for exciting each one of said pair of separately excitable stators for rotating said rotor and shaft in a bidirectional manner, said energizing means exciting one of said stators for rotating said rotor and shaft in a predetermined direction and for axially moving said rotor and shaft into a selected position to obtain a driving connection between said drive means on one end of said shaft and a first one of said plurality of driven means, exciting the other one of said stators for rotating said rotor and shaft in a predetermined direction and for axially moving said rotor and shaft in the opposite direction into a selected position to obtain a driving connection between said drive means on the same end of said shaft and a second one of said plurality of driven means and exciting both of said stators simultaneously for rotating said rotor and shaft in a predetermined direction and for holding said rotor and shaft in a neutral position between said pair of stators to obtain a driving connection between said drive means on the other end of said shaft and a third one of said plurality of driven means, whereby a driving connection between said drive means and a predetermined one of said plurality of driven means is obtained merely by exciting a predetermined one or both of said pair of separately excitable stators.

3. A prime mover apparatus comprising an axially movable rotor having a shaft, a first, a second and a third drive gear on said shaft, a first and a second excitable stator for rotating and axially moving said rotor, a first, a second and a third driven means, energizing means for selectively exciting said stators singly or jointly, said first drive gear normally engaged with said first driven means and operated to drive said first driven means when said first and second stators are jointly excited, said first drive gear disengaged from said first driven means and said second drive gear drivingly engaged with said second driven means when said first stator is excited singly to rotate and to axially move said rotor in a first predetermined direction and disengaged from said first driven means and said third drive gear being drivingly engaged with said third driven means when said second stator is excited singly to rotate and to axially move said rotor in a second predetermined direction.

4. A bi-directional prime mover apparatus comprising an axially movable shaft; drive means on at least one end of said shaft; a plurality of driven means positioned for selective engagement with said drive means; a pair of separately and selectively excitable stators; a rotor operatively connected with said shaft; bi-directional energizing means for said pair of separately and selectively excitable stators; said bi-directional energizing means exciting one of said stators for selectively rotating said rotor and shaft and for axially moving said rotor and shaft into a first position to obtain a driving connection between said drive means and a first one of said plurality of driven means, exciting the other one of said stators for selectively rotating said rotor and shaft and for axially moving said rotor and shaft in the opposite direction into a second position to obtain a driving connection between said drive means and a second one of said plurality of driven means, and exciting both of said stators simultaneously for selectively rotating said rotor and shaft and for holding said rotor and shaft in a neutral position between said pair of stators to obtain a driving connection between said drive means and a third one of said plurality of driven means; whereby a directional driving connection between said drive means and a predetermined one of said plurality of driven means is obtained merely by selective excitation of a predetermined one or both of said pair of separately and selectively excitable stators.

References Cited in the file of this patent
UNITED STATES PATENTS

| | | |
|---|---|---|
| 1,522,742 | Parvin | Jan. 13, 1925 |
| 1,956,041 | Naul | Apr. 24, 1934 |
| 2,271,207 | Rhein | Jan. 27, 1942 |
| 2,345,778 | Van Lammeren et al. | Apr. 4, 1944 |
| 2,805,373 | Bonnell | Sept. 3, 1957 |
| 2,869,008 | Carlsen | Jan. 13, 1959 |